United States Patent
Okazaki

(10) Patent No.: US 9,981,255 B2
(45) Date of Patent: May 29, 2018

(54) CERAMIC HONEYCOMB STRUCTURE AND ITS PRODUCTION METHOD

(71) Applicant: HITACHI METALS, LTD., Minato-ku, Tokyo (JP)

(72) Inventor: Shunji Okazaki, Miyako-gun (JP)

(73) Assignee: HITACHI METALS, LTD., Tokyo (JP)

( * ) Notice: Subject to any disclaimer, the term of this patent is extended or adjusted under 35 U.S.C. 154(b) by 271 days.

(21) Appl. No.: 14/765,871

(22) PCT Filed: Mar. 31, 2014

(86) PCT No.: PCT/JP2014/059433
§ 371 (c)(1),
(2) Date: Aug. 5, 2015

(87) PCT Pub. No.: WO2014/163036
PCT Pub. Date: Oct. 9, 2014

(65) Prior Publication Data
US 2015/0367335 A1 Dec. 24, 2015

(30) Foreign Application Priority Data
Apr. 2, 2013 (JP) .................................. 2013-076868

(51) Int. Cl.
*B01D 46/24* (2006.01)
*B01J 29/70* (2006.01)
(Continued)

(52) U.S. Cl.
CPC .......... *B01J 29/70* (2013.01); *B01D 46/2429* (2013.01); *B01J 23/63* (2013.01); *B01J 35/04* (2013.01);
(Continued)

(58) Field of Classification Search
None
See application file for complete search history.

(56) References Cited

U.S. PATENT DOCUMENTS

| 7,867,598 B2 | 1/2011 | Miyairi et al. |
| 8,394,167 B2 | 3/2013 | Merkel et al. |

(Continued)

FOREIGN PATENT DOCUMENTS

| EP | 2646392 A1 | 10/2013 |
| JP | 2006-517863 A | 8/2006 |

(Continued)

OTHER PUBLICATIONS

International Search Report for PCT/JP2014/059433 dated Jul. 1, 2014.

*Primary Examiner* — Nicholas W. Jordan
(74) *Attorney, Agent, or Firm* — Sughrue Mion, PLLC

(57) ABSTRACT

A ceramic honeycomb structure comprising large numbers of cells partitioned by porous cell walls, the cell walls having (a) porosity of 50-80%, and when measured by mercury porosimetry, (b) a median pore diameter being 25-50 μm, (c) (i) a cumulative pore volume in a pore diameter range of 20 μm or less being 25% or less of the total pore volume, (ii) a cumulative pore volume in a pore diameter range of more than 20 μm and 50 μm or less being 50% or more of the total pore volume, and (iii) a cumulative pore volume in a pore diameter range of more than 50 μm being 12% or more of the total pore volume.

5 Claims, 2 Drawing Sheets

(51) Int. Cl.
*B01J 35/04* (2006.01)
*C04B 35/195* (2006.01)
*C04B 38/00* (2006.01)
*B01J 23/63* (2006.01)
*B01J 35/10* (2006.01)
*B01J 37/00* (2006.01)
*B01J 37/04* (2006.01)
*B01J 37/08* (2006.01)

(52) U.S. Cl.
CPC ........... *B01J 35/10* (2013.01); *B01J 37/0018* (2013.01); *B01J 37/04* (2013.01); *B01J 37/082* (2013.01); *C04B 35/195* (2013.01); *C04B 38/0006* (2013.01); *B01D 2046/2433* (2013.01); *B01D 2046/2437* (2013.01); *C04B 2235/3206* (2013.01); *C04B 2235/3217* (2013.01); *C04B 2235/3222* (2013.01); *C04B 2235/349* (2013.01); *C04B 2235/3418* (2013.01); *C04B 2235/3463* (2013.01); *C04B 2235/3481* (2013.01); *C04B 2235/5436* (2013.01); *C04B 2235/5463* (2013.01); *C04B 2235/6021* (2013.01); *C04B 2235/6562* (2013.01); *C04B 2235/6565* (2013.01); *C04B 2235/80* (2013.01); *C04B 2235/96* (2013.01); *C04B 2235/9607* (2013.01); *Y10T 428/24149* (2015.01)

(56) References Cited

U.S. PATENT DOCUMENTS

| | | | |
|---|---|---|---|
| 8,673,045 | B2 | 3/2014 | Merkel et al. |
| 8,956,436 | B2 | 2/2015 | Divens-Dutcher et al. |
| 2004/0152593 | A1 | 8/2004 | Cutler et al. |
| 2007/0048494 | A1 | 3/2007 | Miyairi et al. |
| 2010/0237007 | A1 | 9/2010 | Merkel et al. |
| 2012/0064286 | A1 | 3/2012 | Hirose et al. |
| 2013/0019579 | A1* | 1/2013 | Okazaki ............. B01D 46/2429 55/523 |
| 2013/0062275 | A1 | 3/2013 | Kobashi et al. |
| 2013/0111862 | A1 | 5/2013 | Divens-Dutcher et al. |
| 2013/0210608 | A1 | 8/2013 | Merkel et al. |
| 2014/0202125 | A1 | 7/2014 | Kobashi et al. |

FOREIGN PATENT DOCUMENTS

| | | | |
|---|---|---|---|
| JP | 2009-542566 A | 12/2009 | |
| JP | 2011-213585 A | 10/2011 | |
| JP | 2012-50978 A | 3/2012 | |
| JP | 2012-197186 A | 10/2012 | |
| WO | 2007/026803 A1 | 3/2007 | |
| WO | WO 2011125797 A1 * | 10/2011 | ......... B01D 46/2429 |
| WO | 2012/074504 A1 | 6/2012 | |

\* cited by examiner

CERAMIC HONEYCOMB STRUCTURE AND ITS PRODUCTION METHOD

CROSS REFERENCE TO RELATED APPLICATIONS

This application is a National Stage of International Application No. PCT/JP2014/059433 filed Mar. 31, 2014, claiming priority based on Japanese Patent Application No. 2013-076868, filed Apr. 2, 2013, the contents of all of which are incorporated herein by reference in their entirety.

FIELD OF THE INVENTION

The present invention relates to a ceramic honeycomb structure used for cleaning exhaust gases discharged from internal engines of automobiles, etc., and its production method.

BACKGROUND OF THE INVENTION

To remove harmful substance such as particulate matter (PM) and NOx (nitrogen oxide), HC (hydrocarbon), CO (carbon monoxide), SOx (sulfur oxide), etc. from exhaust gases discharged from internal engines of construction machines, industrial machines, etc., ceramic honeycomb structures are used as carriers for catalysts for cleaning exhaust gases, and filters for capturing fine particles. As shown in FIGS. 1(a) and 1(b), a ceramic honeycomb structure 1 comprises large numbers of cells 13 partitioned by porous cell walls 12 and extending in an exhaust-gas-flowing direction. A ceramic honeycomb structure used as a catalyst carrier carries an exhaust-gas-cleaning catalyst on its cell wall surfaces and in pores inside the cell walls, so that an exhaust gas passing through the ceramic honeycomb structure is cleaned by the catalyst.

When an exhaust gas is cleaned by such a ceramic honeycomb structure, harmful substance in the exhaust gas should come into efficient contact with a catalyst carried by cell walls to improve cleaning efficiency. Generally conducted to this end is to increase a cell density by decreasing the opening areas of cells, thereby obtaining a large contact area with a catalyst. However, increase in the cell density results in increase in pressure loss.

To solve such problem, JP 2006-517863 A discloses a catalyst support comprising a porous ceramic honeycomb structure having pluralities of parallel cells penetrating from the inlet ends to the outlet ends, which has porosity of more than 45% by volume, as well as a network structure having communicating pores having a narrow pore diameter distribution having a median pore diameter of more than 5 μm and less than 30 μm. JP 2006-517863 A describes that this catalyst support (ceramic honeycomb structure) can bear a higher percentage of a catalyst without suffering pressure decrease.

WO 2007/026803 A1 discloses a ceramic honeycomb structure comprising pluralities of cells penetrating between two end surfaces, which are constituted by porous cell walls having large numbers of pores, and plugs for sealing the cells at either end surfaces or inside the cells, the cell walls having permeability of $7 \times 10^{-12}$ m$^2$ to $4 \times 10^{-8}$ m$^2$. WO 2007/026803 A1 describes that this ceramic honeycomb structure exhibits excellent cleaning efficiency with small pressure loss.

In the ceramic honeycomb structures described in JP 2006-517863 A and WO 2007/026803 A1, however, pores in the cell walls may be clogged by a catalyst applied to the cell wall surfaces and pores in the cell walls, resulting in large pressure loss in a catalyst-carrying ceramic honeycomb structure. As a result, a catalyst carried in pores in the cell walls is unlikely used effectively, failing to obtain improved cleaning efficiency. Particularly in a ceramic honeycomb structure (catalyst carrier) having no plugs, like the catalyst support described in JP 2006-517863 A, an exhaust gas may not be easily flowable through pores in the cell walls, resulting in poor cleaning efficiency. Further, the ceramic honeycomb structure of WO 2007/026803 A1 has poor strength, because its cell walls per se have small strength due to large permeability.

OBJECT OF THE INVENTION

Accordingly, an object of the present invention is to provide a ceramic honeycomb structure for cleaning an exhaust gas, which has high strength without plugs, while securing good flowability of an exhaust gas through pores in cell walls, and which exhibits high capability of removing harmful substance with small pressure loss when carrying a catalyst.

SUMMARY OF THE INVENTION

As a result of intensive research in view of the above object, the inventor has found that a ceramic honeycomb structure comprising large numbers of cells partitioned by porous cell walls has high strength as well as high flowability of an exhaust gas through pores, when the cell walls has (a) porosity of 50-80%, and when measured by mercury porosimetry, (b) a median pore diameter being 25-50 μm, (c) a cumulative pore volume in a pore diameter range of 20 μm or less being 25% or less of the total pore volume, (d) a cumulative pore volume in a pore diameter range of more than 20 μm and 50 μm or less being 50% or more of the total pore volume, and (e) a cumulative pore volume in a pore diameter range of more than 50 μm being 12% or more of the total pore volume. The present invention has been completed based on such finding.

Thus, the ceramic honeycomb structure of the present invention comprises large numbers of cells partitioned by porous cell walls, the cell walls having
(a) porosity of 50-80%; and
when measured by mercury porosimetry,
(b) a median pore diameter being 25-50 μm;
(c) (i) a cumulative pore volume in a pore diameter range of 20 μm or less being 25% or less of the total pore volume;
(ii) a cumulative pore volume in a pore diameter range of more than 20 μm and 50 μm or less being 50% or more of the total pore volume; and
(iii) a cumulative pore volume in a pore diameter range of more than 50 μm being 12% or more of the total pore volume.

The opening area ratio of pores open on the cell wall surfaces (the total opening area of pores per a unit cell wall surface area) is preferably 30% or more.

The median opening diameter of pores open on the cell wall surfaces is preferably 60 μm or more (expressed by equivalent circle diameter).

With respect to pores open on the cell wall surfaces, a cumulative opening area in a pore opening diameter range of 30 μm or less (expressed by equivalent circle diameter) is preferably 20% or less of the total opening area.

With respect to pores open on the cell wall surfaces, a cumulative opening area in a pore opening diameter range of}

100 μm or more (expressed by equivalent circle diameter) is preferably 30-70% of the total opening area.

The cell walls preferably have permeability of $10\times10^{-12}$ m$^2$ to $30\times10^{-12}$ m$^2$.

The ceramic honeycomb structure preferably has an A-axis compression strength of 1.0 MPa or more.

The method of the present invention for producing a ceramic honeycomb structure comprises the steps of blending material powder comprising a cordierite-forming material and a pore-forming material to obtain a moldable material, extruding the moldable material to obtain a honeycomb-shaped green body, and drying and sintering the green body to obtain a ceramic honeycomb structure,
(a) the cordierite-forming material comprising 10-25% by mass of silica having a median particle diameter of 10-60 μm;
(b) the pore-forming material having
(i) a median particle diameter of more than 70 μm and 200 μm or less,
(ii) in a curve of a cumulative volume (cumulative volume of particles up to a particular particle diameter) to a particle diameter, a particle diameter D90 at a cumulative volume corresponding to 90% of the total volume being 90-250 μm, and a particle diameter D10 at a cumulative volume corresponding to 10% of the total volume being 15-160 μm, and
(iii) a particle diameter distribution deviation SD being 0.3 or less; and
(c) the amount of the pore-forming material added being 1-20% by mass per the cordierite-forming material.

DESCRIPTION OF THE PREFERRED EMBODIMENTS

Figure 1A:
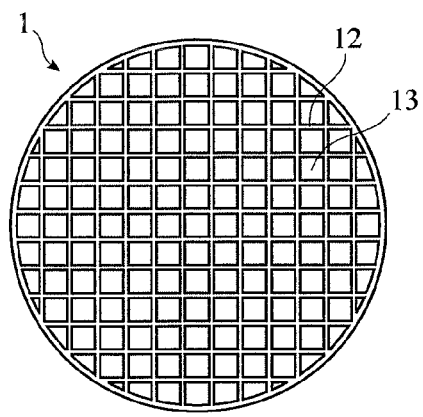
FIG. 1(a) is a front view schematically showing an example of the ceramic honeycomb structures of the present invention.
Figure 1B:
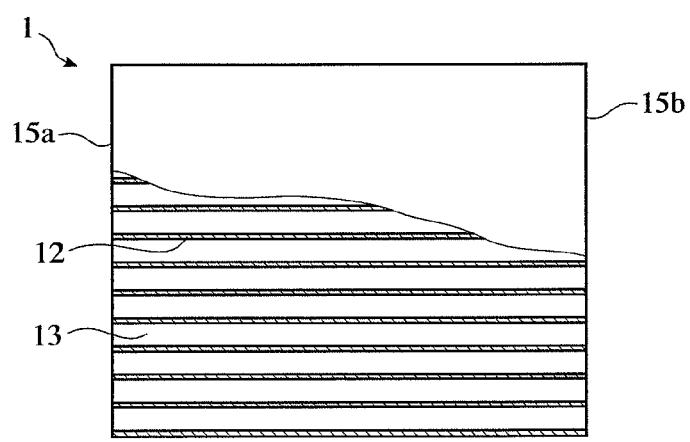
FIG. 1(b) is a partial cross-sectional view schematically showing an example of the ceramic honeycomb structures of the present invention.

The embodiments of present invention will be specifically explained below without intention of restricting the present invention thereto. Proper modifications, improvements, etc. may be made based on the common knowledge of those skilled in the art, within the scope of the present invention.

The ceramic honeycomb structure of the present invention comprises large numbers of cells partitioned by porous cell walls, the cell walls having
(a) porosity of 50-80%; and
when measured by mercury porosimetry,
(b) a median pore diameter being 25-50 μm;
(c) (i) a cumulative pore volume in a pore diameter range of 20 μm or less being 25% or less of the total pore volume,
(ii) a cumulative pore volume in a pore diameter range of more than 20 μm and 50 μm or less being 50% or more of the total pore volume, and
(iii) a cumulative pore volume in a pore diameter range of more than 50 μm being 12% or more of the total pore volume.

With a catalyst carried on the ceramic honeycomb structure of the present invention, an exhaust gas can easily flow through pores inside the cell walls, resulting in an exhaust-gas-cleaning ceramic honeycomb structure having high capability of catalytically removing harmful substance with small pressure loss.

(a) Porosity of Cell Walls

The cell walls have porosity of 50-80%. When the cell walls have porosity of less than 50%, a catalyst-carrying ceramic honeycomb structure cannot keep low pressure loss. When the porosity exceeds 80%, the ceramic honeycomb structure does not have practically acceptable strength. The porosity is preferably 55-75%, more preferably 58-72%.

(b) Median Pore Diameter of Cell Walls

The median pore diameter measured by mercury porosimetry is 25-50 μm. A catalyst-carrying ceramic honeycomb structure may suffer poor pressure loss characteristics at a median pore diameter of less than 25 μm, and may practically suffer low strength at a median pore diameter of more than 50 μm. The median pore diameter is preferably 28-45 μm, more preferably 30-40 μm.

(c) Pore Diameter Distribution of Cell Walls

When the cell walls are measured by mercury porosimetry, (i) a cumulative pore volume in a pore diameter range of 20 μm or less is 25% or less of the total pore volume, (ii) a cumulative pore volume in a pore diameter range of more than 20 μm and 50 μm or less is 50% or more of the total pore volume, and (iii) a cumulative pore volume in a pore diameter range of more than 50 μm is 12% or more of the total pore volume. With the cell walls having such pore diameter distribution, a catalyst-carrying ceramic honeycomb structure permits an exhaust gas to easily flow through pores in the cell walls while keeping high strength as a ceramic honeycomb structure, thereby exhibiting high capability of catalytically removing harmful substance with small pressure loss.

When the cumulative pore volume in a pore diameter range of 20 μm or less is more than 25% of the total pore volume, a smaller percentage of pores have diameters of more than 20 μm, resulting in more pressure loss. The cumulative pore volume in a pore diameter range of 20 μm or less is preferably 3-22%, more preferably 5-18%.

When the cumulative pore volume in a pore diameter range of more than 20 μm and 50 μm or less is less than 50% of the total pore volume, a catalyst-carrying ceramic honeycomb structure has larger percentages of fine pores and coarse pores, resulting in poor pressure loss characteristics and low strength. The cumulative pore volume in a pore diameter range of more than 20 μm and 50 μm or less is preferably 55-80%, more preferably 60-75%.

When the cumulative pore volume in a pore diameter range of more than 50 μm is less than 12% of the total pore volume, a catalyst-carrying ceramic honeycomb structure has poor pressure loss characteristics. The cumulative pore volume in a pore diameter range of more than 50 μm is preferably 15-30%, more preferably 18-25%.

The pore distribution deviation σ is preferably 0.35 or less. When the pore distribution deviation σ is more than 0.35, there is a larger percentage of pores deteriorating pressure loss and strength. The pore distribution deviation σ is preferably 0.32 or less, more preferably 0.30 or less. The pore distribution deviation σ meets the relation of $\sigma=\log(d_{20})-\log(d_{80})$, wherein $d_{20}$ represents a pore diameter (μm) at a cumulative pore volume corresponding to 20% of the total pore volume, and $d_{80}$ represents a pore diameter (μm) at a cumulative pore volume corresponding to 80% of the total pore volume, $d_{80}<d_{20}$, in a curve of a cumulative pore volume (cumulative volume of pores in a range from the maximum pore diameter to a particular pore diameter) to a pore diameter. The relation between a pore diameter and a cumulative pore volume can be determined by mercury porosimetry. The measurement is preferably conducted by a mercury porosimeter.

(d) Opening Area Ratio of Pores Open on Cell Wall Surfaces

The opening area ratio of pores open on the cell wall surfaces (total opening area of pores per a unit cell wall surface area) is preferably 30% or more. When the opening area ratio is less than 30%, an exhaust gas cannot flow through pores in the cell walls easily, likely resulting in less contact with a catalyst carried on the cell wall surfaces or inside their pores, and thus lower cleaning efficiency.

Figure 2:
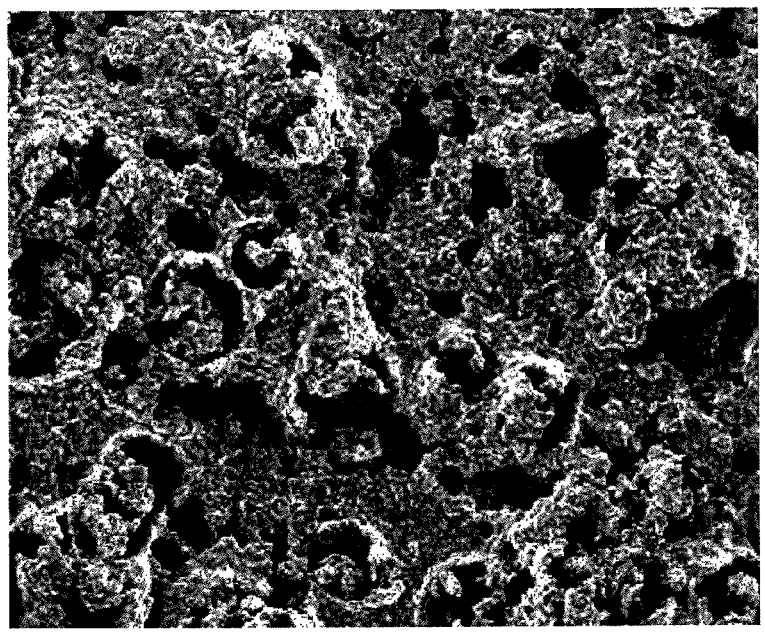
FIG. 2 is an electron photomicrograph showing a cell wall surface of the ceramic honeycomb structure of the present invention.

As shown in FIG. 2, for example, the opening area ratio of pores open on the cell wall surfaces is determined by measuring the total opening area of pores on an electron photomicrograph of a cell wall surface with a field area 2 times or more the cell wall thickness (in a field of 600 μm×600 μm or more, for example, when the cell wall thickness is 300 μm) by an image analyzer (for example, Image-Pro Plus ver.6.3 available from Media Cybernetics), and dividing it by the field area measured.

(e) Median Opening Diameter of Pores Open on Cell Wall Surfaces

The median opening diameter of pores open on the cell wall surfaces is preferably 60 μm or more, when expressed by an equivalent circle diameter. When the median opening diameter is less than 60 μm, a catalyst-carrying ceramic honeycomb structure may have large pressure loss.

The median opening diameter of pores open on the cell wall surfaces is an equivalent circle diameter of pores at a cumulative area corresponding to 50% of the total pore area, in a graph plotting a cumulative opening area of pores on the cell wall surfaces [a cumulative opening area of pores in a range of a particular equivalent circle diameter (diameter of a circle having the same area as the opening area of each pore) or less] to the equivalent circle diameters of opening pores. The opening areas and equivalent circle diameters of pores can be determined by analyzing an electron photomicrograph of the cell wall surface by an image analyzer (for example, Image-Pro Plus ver.6.3 available from Media Cybernetics).

(f) Pore Diameter Distribution on Cell Wall Surfaces (i) Cumulative Opening Area of Pores Having Opening Diameters of 30 μm or Less on Cell Wall Surfaces The cumulative opening area of pores having opening diameters (each expressed by an equivalent circle diameter) of 30 μm or less on the cell wall surfaces is preferably 20% or less of the total opening area. When the cumulative opening area in a pore opening diameter range of 30 μm or less is more than 20% of the total opening area, a catalyst-carrying ceramic honeycomb structure may have large pressure loss. The cumulative opening area in a pore opening diameter range of 30 μm or less is preferably 17% or less, more preferably 15% or less, of the total opening area.

(ii) Cumulative Opening Area of Pores Having Opening Diameters of 100 μm or More on Cell Wall Surfaces The cumulative opening area of pores having opening diameters (each expressed by an equivalent circle diameter) of 100 μm or more on the cell wall surfaces is preferably 30-70% of the total opening area. When the cumulative opening area in a pore opening diameter range of 100 μm or more is less than 30% of the total opening area, an exhaust gas is less flowable through pores in the cell walls, likely resulting in less contact with a catalyst carried on the cell wall surfaces or inside their pores, and thus lower cleaning efficiency. When it is more than 70%, the ceramic honeycomb structure has low strength. The cumulative opening area in a pore opening diameter range of 100 μm or more is preferably 33-65%, more preferably 35-60%, of the total opening area.

(g) Permeability

The cell walls preferably have permeability of $10 \times 10^{-12}$ $m^2$ to $30 \times 10^{-12}$ $m^2$. With the cell walls having permeability of $10 \times 10^{-12}$ $m^2$ to $30 \times 10^{-12}$ $m^2$, an exhaust-gas-cleaning ceramic honeycomb structure having higher capability of catalytically removing harmful substance and suffering smaller pressure loss even after carrying a catalyst can be obtained. A catalyst-carrying ceramic honeycomb structure has large pressure loss at a cell wall permeability of less than $10 \times 10^{-12}$ $m^2$, while it may have low cell wall strength at a cell wall permeability of more than $30 \times 10^{-12}$ $m^2$. The permeability of the cell walls is preferably $12 \times 10^{-12}$ $m^2$ to $28 \times 10^{-12}$ $m^2$.

(h) A-Axis Compression Strength

The ceramic honeycomb structure preferably has an A-axis compression strength of 1.0 MPa or more. With an A-axis compression strength of 1.0 MPa or more, an exhaust-gas-cleaning ceramic honeycomb structure can have higher capability of catalytically removing harmful substance with smaller pressure loss even after carrying a catalyst. When the A-axis compression strength is less than 1.0 MPa, the ceramic honeycomb structure may not be able to keep practically acceptable strength. the A-axis compression strength is preferably 1.2 MPa or more.

(i) Thermal Expansion Coefficient

The ceramic honeycomb structure preferably has a thermal expansion coefficient of $15 \times 10^{-7}$/° C. or less between 20° C. and 800° C. The ceramic honeycomb structure having such a thermal expansion coefficient is sufficiently practically acceptable as a catalyst carrier for cleaning an exhaust gas discharged from internal engines, or a filter for capturing fine particles therein, because of high heat shock resistance. The thermal expansion coefficient is preferably $3 \times 10^{-7}$/° C. to $13 \times 10^{-7}$/° C.

(j) Other Structural Features

The ceramic honeycomb structure preferably has an average cell wall thickness of 0.10-0.50 mm and an average cell density of 150-500 cpsi. With such average cell wall thickness and average cell density, the ceramic honeycomb structure can be turned to an exhaust-gas-cleaning ceramic honeycomb structure having small pressure loss while keeping high strength. The cell walls have low strength at an average cell wall thickness of less than 0.10 mm, and have difficulty in keeping low pressure loss at an average cell wall thickness of more than 0.50 mm. The average cell wall thickness is preferably 0.15-0.45 mm. The cell walls have low strength at an average cell density of less than 150 cpsi (23.3 cells/$cm^2$), and have difficulty in keeping low pressure loss at an average cell density of more than 500 cpsi (77.5 cells/$cm^2$). The average cell density is preferably 170-300 cpsi, more preferably 160-280 cpsi.

Materials for the ceramic honeycomb structure are preferably heat-resistant ceramics comprising as main crystals, alumina, mullite, cordierite, silicon carbide, silicon nitride, zirconia, aluminum titanate, lithium aluminum silicate, etc., because the ceramic honeycomb structure is used as a catalyst carrier for cleaning exhaust gases or a filter for capturing fine particles therein. Among them, ceramics comprising cordierite as main crystals for excellent heat shock resistance with low thermal expansion are preferable. When the main crystal phase is cordierite, other crystal phases such as spinel, mullite, sapphirine, etc. may be contained, and glass components may also be contained.

[2] Production Method of Ceramic Honeycomb Structure

The method of the present invention for producing a ceramic honeycomb structure comprises the steps of blending a material powder comprising a cordierite-forming material and a pore-forming material to obtain a moldable material, extruding the moldable material to obtain a honeycomb-shaped green body, and drying and sintering the green body to obtain a ceramic honeycomb structure, (a) the cordierite-forming material comprising 10-25% by mass of silica having a median particle diameter of 10-60 μm;

(b) the pore-forming material having (i) a median particle diameter of more than 70 μm and 200 μm or less, (ii) in a curve of a cumulative volume (cumulative volume of particles up to a particular particle diameter) to a particle diameter, a particle diameter D90 at a cumulative volume corresponding to 90% of the total volume being 90-250 μm, and a particle diameter D10 at a cumulative volume corresponding to 10% of the total volume being 15-160 μm, and (iii) a particle diameter distribution deviation SD being 0.3 or less, and (c) the amount of the pore-forming material added being 1-20% by mass per the cordierite-forming material.

Such method can produce a ceramic honeycomb structure comprising cell walls having porosity of 50-80%, and when measured by mercury porosimetry, a median pore diameter being 25-50 μm, (i) a cumulative pore volume in a pore diameter range of 20 μm or less being 25% or less of the total pore volume, (ii) a cumulative pore volume in a pore diameter range of more than 20 μm and 50 μm or less being 50% or more of the total pore volume, and (iii) a cumulative pore volume in a pore diameter range of more than 50 μm being 12% or more of the total pore volume.

(a) Cordierite-Forming Material

The cordierite-forming material is obtained by mixing a silica source powder, an alumina source powder and a magnesia source powder, to form cordierite as a main crystal having a chemical composition comprising 42-56% by mass of $SiO_2$, 30-45% by mass of $Al_2O_3$, and 12-16% by mass of MgO. Pores in the ceramics comprising cordierite as a main crystal have pores formed by sintering silica, and pores generated by burning the pore-forming material.

10-25% of silica having a median particle diameter of 10-60 μm is used for the cordierite-forming material. When silica has a median particle diameter of less than 10 μm, there are many fine pores deteriorating pressure loss characteristics. When it exceeds 60 μm, there are many coarse pores lowering strength. The median particle diameter of silica is preferably 35-55 μm.

(b) Pore-Forming Material

The pore-forming material has a median particle diameter of more than 70 μm and 200 μm or less. When the median particle diameter of the pore-forming material is 70 μm or less, relatively small pores may be formed on and in the cell walls, resulting in less effective contact with a catalyst, and thus a lower cleaning efficiency. When the median particle diameter is more than 200 μm, large pores are formed, resulting in lower strength. The median particle diameter of the pore-forming material is preferably 75-180 μm, more preferably 80-150 μm.

In a curve of a cumulative volume (cumulative volume of particles up to a particular particle diameter) to a particle diameter of the pore-forming material, a particle diameter D90 at a cumulative volume corresponding to 90% of the total volume is 90-250 μm, a particle diameter D10 at a cumulative volume corresponding to 10% of the total volume is 15-160 μm, and a particle diameter distribution deviation SD is 0.3 or less.

When the pore-forming material has such a particle diameter distribution, cell walls having the above pore structure are likely obtained. The particle diameter D10 and the particle diameter D90 meet the relation of D90>D10.

The particle diameter distribution deviation SD is a value expressed by SD=log(D80)−log(D20), wherein D20 represents a particle diameter (μm) at a cumulative volume of 20%, and D80 represents a particle diameter (μm) at a cumulative volume of 80%, in a curve of a cumulative volume [volume (%) of particles up to a particular particle diameter relative to the total volume] to a particle diameter, which is called a cumulative particle diameter distribution curve. D20<D80. The particle diameter distribution deviation SD is preferably 0.27 or less, more preferably 0.25 or less. The particle diameter (particle distribution) of the pore-forming material can be measured by a particle diameter distribution meter (Microtrack MT3000 available from Nikkiso Co., Ltd.).

The pore-forming material may be flour, graphite, starch, solid or hollow resins (polymethylmethacrylate, polybutylmethacrylate, polyacrylates, polystyrenes, polyethylene, polyethylene terephthalate, methylmethacrylate/acrylonitrile copolymers, etc.), etc. Among them, hollow resin particles are preferable, and hollow particles of methylmethacrylate/acrylonitrile copolymers are more preferable. The hollow resin particles preferably have shells as thick as 0.1-2 μm, and contain a hydrocarbon gas, etc. They preferably contain 70-95% of moisture. With moisture, the resin particles are well slidable, avoiding collapsing in mixing, blending and molding.

(c) Production Steps

The ceramic honeycomb structure is produced by blending a material powder comprising a cordierite-forming material and a pore-forming material with a binder, water, etc. to prepare a moldable material, which is extruded from a die by a known method to form a honeycomb-shaped green body; drying the green body; machining end and peripheral surfaces, etc. of the green body, if necessary; and then sintering the green body.

Sintering is conducted by controlling heating and cooling speeds in a continuous or batch furnace. When the ceramic material is a cordierite-forming material, it is kept at 1350-1450° C. for 1-50 hours to sufficiently form cordierite as a main crystal, and then cooled to room temperature to obtain a ceramic honeycomb structure formed by cordierite as a main crystal phase. The ceramic honeycomb structure may contain other crystal phases such as spinel, mullite, sapphirine, etc., and further glass components. Particularly when a large ceramic honeycomb structure having an outer diameter of 150 mm or more and a length of 150 mm or more is produced, the temperature-elevating speed is preferably 0.2-10° C./hr in a binder-decomposing temperature range, for example, between 150° C. and 350° C., and 5-20° C./hr in a cordierite-forming temperature range, for example, between 1150° C. and 1400° C., thereby preventing cracking in the green body in the sintering process. The cooling is preferably conducted at a speed of 20-40° C./h in a temperature range of 1400° C. to 1300° C.

A catalyst comprising one or more precious metals selected from Pt, Rh and Pd may be carried on cell walls of the resultant honeycomb ceramic structure, to provide an exhaust-gas-cleaning catalyst filter.

The honeycomb ceramic structure may be plugged in ends of or inside desired flow paths by a known method to form a ceramic honeycomb filter. Plugs may be formed before sintering.

(1) Production of Ceramic Honeycomb Structures (Examples 1-16 and Comparative Examples 1-10)

Silica powder, kaolin powder, talc powder, alumina powder, and aluminum hydroxide powder having particle diameters shown in Table 1 were mixed with each other in proportions shown in Table 3, thereby obtaining each cordierite-forming material powder having a chemical composition comprising 50% by mass of $SiO_2$, 35% by mass of $Al_2O_3$ and 13% by mass of MgO. This cordierite-forming material powder was mixed with a pore-forming material shown in Table 2 and methyl cellulose, and then blended with water to prepare a plastically moldable ceramic material comprising a cordierite-forming material.

Each moldable material was extruded from an extrusion die to form a honeycomb-shaped green body having cell wall thickness of 13 mil (0.33 mm) and a cell density of 255 cpsi (39.5 cells/cm$^2$). After drying, a peripheral portion was removed from the dried honeycomb-shaped body, which was sintered at the highest temperature of 1410° C. for 200 hours in a furnace, thereby obtaining a ceramic honeycomb structure formed by cordierite as a main crystal. The sintered ceramic honeycomb structure was provided with a peripheral layer of amorphous silica and colloidal silica, and then dried to obtain a ceramic honeycomb structure having an outer diameter of 266.7 mm and a length of 304.8 mm. In each of Examples 1-16 and Comparative Examples 1-10, two ceramic honeycomb structures were produced.

(2) Measurement of Cell Wall Structure, Permeability and Strength of Ceramic Honeycomb Structure A sample was cut out of one of the ceramic honeycomb structures obtained in each of Examples 1-16 and Comparative Examples 1-10, to measure a pore distribution in the cell walls by mercury porosimetry, the diameters of pores open on the cell wall surfaces and its distribution, permeability, and A-axis compression strength. The results are shown in Table 4.

A test piece (10 mm×10 mm×10 mm) cut out of each ceramic honeycomb filter was set in a measurement cell of Autopore III available from Micromeritics, and the cell was evacuated. Thereafter, mercury was introduced into the cell under pressure to determine by mercury porosimetry the relation between the pressure and the volume of mercury intruded into pores in the test piece, from which the relation between a pore diameter and a cumulative pore volume (cumulative pore volume distribution curve) was determined. The mercury-intruding pressure was 0.5 psi (0.35× 10$^{-3}$ kg/mm$^2$), and constants used for calculating the pore diameter from the pressure were a contact angle of 130°, and a surface tension of 484 dyne/cm.

Porosity, pore diameter and pore distribution are obtained from a cumulative pore volume distribution curve determined by mercury porosimetry, namely from the relation between a pore diameter and a cumulative pore volume. The porosity was calculated from the measured total pore volume, using 2.52 g/cm$^3$ as the true density of cordierite. The median pore diameter and the pore diameter distribution (cumulative pore volume in a pore diameter range of 20 μm or less, cumulative pore volume in a pore diameter range of more than 20 μm and 50 μm or less, and cumulative pore volume in a pore diameter range of more than 50 μm) were determined from the cumulative pore volume distribution curve.

The diameters of pores open on the cell wall surfaces and its distribution were determined from an electron photomicrograph of a cell wall surface in a field of 800 μm×800 μm, by an image analyzer (for example, Image-Pro Plus ver.6.3 available from Media Cybernetics). The opening area ratio and median opening diameter (expressed by equivalent circle diameter) of pores open on cell wall surfaces, the cumulative opening area in a pore opening diameter range of 30 μm or less, and the cumulative opening area in a pore opening diameter range of 100 μm or more were calculated.

The maximum value of permeability measured by Perm Automated Porometer (registered trademark) 6.0 available from Porous Materials, Inc. while increasing an air flow rate from 30 cc/sec to 400 cc/sec was used as permeability.

The A-axis compression strength was measured according to "Test Method Of Exhaust-Gas-Cleaning Ceramic Monolith Carrier For Automobiles," JASO standards M505-87 of the Society of Automotive Engineers of Japan.

The thermal expansion coefficient (CTE) between 20° C. and 800° C. was measured on another test piece cut out of the honeycomb filter.

(3) Evaluation of Filter Performance

The remaining one of the ceramic honeycomb structures in each of Examples 1-16 and Comparative Examples 1-10 was provided with a catalyst as follows, to evaluate the pressure loss and catalytic effect of the resultant filter.

(a) Carrying of Catalyst

A catalyst slurry comprising active alumina, platinum (Pt) as a precious metal, and cerium oxide (CeO$_2$) as a co-catalyst was applied to cell wall surfaces and pores in the cell walls of the ceramic honeycomb structure by a suction method, to form a catalyst coating, which was dried by heating to produce a catalyst-carrying ceramic honeycomb structure.

(b) Pressure Loss

Air was supplied at a flow rate of 10 Nm$^3$/min to a ceramic honeycomb structure fixed to a pressure loss test stand, to measure pressure difference between the inlet side and the outlet side as initial pressure loss. The pressure loss was evaluated relative to pressure loss in Comparative Example 1 by the following standard.

Poor: The pressure loss was 0.9 times or more,

Fair: It was more than 0.7 times and 0.9 times or less,

Good: It was more than 0.5 times and 0.7 times or less, and

Excellent: It was 0.5 times or less.

The results are shown in Table 4.

(c) Catalytic Effect

An exhaust gas containing 400 ppm of NOx at a temperature of 300° C. was supplied to a catalyst-carrying ceramic honeycomb structure, and a diesel fuel (HC) in the same amount as that of NOx was added to measure the NOx content in the exhaust gas at the outlet of the catalyst-carrying ceramic honeycomb structure, thereby evaluating a catalytic cleaning effect with a relative value of the NOx content that of Comparative Example 1 by the following standard.

Poor: It was 0.9 times or more,

Fair: It was more than 0.7 times and 0.9 times or less,

Good: It was more than 0.5 times and 0.7 times or less, and

Excellent: It was 0.5 times or less.

The results are shown in Table 4.

TABLE 1

| Material | Median Particle Diameter (μm) |
|---|---|
| Silica A | 4.4 |
| Silica B | 11.0 |
| Silica C | 20.2 |
| Silica D | 41.0 |
| Silica E | 58.3 |
| Silica F | 75.0 |
| Kaolin | 3.1 |
| Talc | 10.0 |
| Alumina | 6.1 |
| Aluminum Oxide | 1.8 |

TABLE 2

| Pore-Forming Material | Type | Median Particle Diameter (μm) | d90 (μm) | d10 (μm) | SD[(1)] |
|---|---|---|---|---|---|
| A | Hollow Resin | 42.0 | 83.2 | 13.5 | 0.41 |
| B | Hollow Resin | 72.1 | 105.0 | 15.3 | 0.30 |
| C | Hollow Resin | 79.3 | 129.0 | 59.0 | 0.24 |
| D | Hollow Resin | 96.5 | 135.8 | 68.4 | 0.22 |
| E | Hollow Resin | 165.0 | 200.0 | 85.0 | 0.26 |
| F | Hollow Resin | 191.0 | 250.0 | 101.0 | 0.22 |
| G | Hollow Resin | 240.0 | 295.0 | 110.0 | 0.30 |
| H | Graphite | 150.0 | 235.0 | 41.0 | 0.30 |

Note:
[(1)]SD represents a particle diameter distribution deviation.

TABLE 3

| No. | Silica Type | Silica % by mass | Kaolin % by mass | Talc % by mass | Alumina % by mass | Aluminum Oxide % by mass | Pore-Forming Material Type | Pore-Forming Material % by mass |
|---|---|---|---|---|---|---|---|---|
| Example 1 | B | 20.3 | 6.1 | 42 | 22.1 | 9.5 | D | 9.0 |
| Example 2 | C | 20.3 | 6.1 | 42 | 22.0 | 9.6 | D | 9.0 |
| Example 3 | D | 20.3 | 6.1 | 42 | 22.1 | 9.5 | D | 9.0 |
| Example 4 | E | 20.2 | 6.2 | 42 | 22.1 | 9.5 | D | 9.0 |
| Example 5 | D | 20.3 | 6.1 | 42 | 22.1 | 9.5 | B | 9.0 |
| Example 6 | D | 20.3 | 6.1 | 42 | 22.1 | 9.5 | C | 9.0 |
| Example 7 | D | 20.3 | 6.1 | 42 | 22.1 | 9.5 | E | 9.0 |
| Example 8 | D | 20.3 | 6.1 | 42 | 22.1 | 9.5 | F | 9.0 |
| Example 9 | D | 20.3 | 6.1 | 42 | 22.0 | 9.6 | D | 18.0 |
| Example 10 | D | 20.3 | 6.1 | 42 | 22.0 | 9.6 | D | 2.0 |
| Example 11 | D | 12.0 | 15.4 | 41 | 22.0 | 9.6 | D | 9.0 |
| Example 12 | D | 24.0 | 2.4 | 42 | 22.1 | 9.5 | D | 9.0 |
| Example 13 | D | 20.3 | 6.1 | 42 | 22.1 | 9.5 | D | 6.0 |
| Example 14 | E | 20.3 | 6.1 | 42 | 22.1 | 9.5 | H | 20.0 |
| Example 15 | B | 20.3 | 6.1 | 42 | 22.0 | 9.6 | B | 7.0 |
| Example 16 | C | 20.3 | 6.1 | 42 | 22.1 | 9.5 | B | 7.0 |
| Com. Ex. 1 | A | 20.3 | 6.1 | 42 | 22.1 | 9.5 | A | 9.0 |
| Com. Ex. 2 | A | 20.3 | 6.1 | 42 | 22.1 | 9.5 | C | 9.0 |
| Com. Ex. 3 | A | 20.3 | 6.1 | 42 | 22.1 | 9.5 | G | 9.0 |
| Com. Ex. 4 | F | 20.3 | 6.1 | 42 | 22.1 | 9.5 | C | 9.0 |
| Com. Ex. 5 | F | 20.3 | 6.1 | 42 | 22.1 | 9.5 | A | 9.0 |
| Com. Ex. 6 | F | 20.3 | 6.1 | 42 | 22.1 | 9.5 | G | 9.0 |
| Com. Ex. 7 | D | 20.3 | 6.1 | 42 | 22.1 | 9.5 | A | 9.0 |
| Com. Ex. 8 | D | 20.3 | 6.1 | 42 | 22.1 | 9.5 | G | 9.0 |
| Com. Ex. 9 | D | 20.3 | 6.1 | 42 | 22.1 | 9.5 | D | 0.5 |
| Com. Ex. 10 | D | 20.3 | 6.1 | 42 | 22.1 | 9.5 | D | 25.0 |

TABLE 4

| | Pores Measured by Mercury Porosimetry | | | | |
|---|---|---|---|---|---|
| No. | Total Pore Volume (cm³/g) | Porosity (%) | Median Pore Diameter (μm) | Cumulative Pore Volume (%) | |
| | | | | PD[(1)] ≤ 20 | 20 < PD ≤ 50 |
| Example 1 | 0.605 | 60.4 | 28.0 | 23.1 | 63.6 |
| Example 2 | 0.630 | 61.4 | 30.0 | 20.0 | 64.1 |
| Example 3 | 0.780 | 66.3 | 33.0 | 21.8 | 61.5 |
| Example 4 | 0.880 | 68.9 | 35.0 | 17.6 | 65.9 |
| Example 5 | 0.640 | 61.7 | 29.3 | 20.0 | 67.5 |
| Example 6 | 0.700 | 63.8 | 30.2 | 24.3 | 60.0 |
| Example 7 | 0.900 | 69.4 | 36.0 | 19.1 | 62.6 |
| Example 8 | 1.250 | 75.9 | 41.0 | 20.0 | 52.0 |
| Example 9 | 1.200 | 75.1 | 45.0 | 13.3 | 57.5 |
| Example 10 | 0.450 | 53.1 | 28.0 | 24.9 | 56.2 |
| Example 11 | 0.700 | 63.8 | 29.0 | 20.0 | 65.7 |
| Example 12 | 0.910 | 69.6 | 31.2 | 23.1 | 56.0 |
| Example 13 | 0.715 | 64.3 | 30.4 | 17.5 | 67.8 |
| Example 14 | 0.896 | 69.3 | 40.0 | 16.3 | 55.8 |
| Example 15 | 0.580 | 59.4 | 26.8 | 24.1 | 62.6 |
| Example 16 | 0.610 | 60.9 | 28.0 | 23.3 | 59.8 |

TABLE 4-continued

| No. | | | | | |
|---|---|---|---|---|---|
| Com. Ex. 1 | 0.300 | 43.1 | 21.0 | 46.7 | 45.0 |
| Com. Ex. 2 | 0.350 | 46.9 | 25.0 | 25.7 | 62.9 |
| Com. Ex. 3 | 0.399 | 50.1 | 29.0 | 27.3 | 58.9 |
| Com. Ex. 4 | 2.000 | 83.4 | 55.0 | 15.0 | 25.0 |
| Com. Ex. 5 | 1.580 | 79.9 | 50.0 | 5.1 | 19.0 |
| Com. Ex. 6 | 2.200 | 84.7 | 60.0 | 11.4 | 34.1 |
| Com. Ex. 7 | 0.690 | 63.5 | 22.0 | 30.4 | 52.2 |
| Com. Ex. 8 | 0.950 | 70.5 | 45.0 | 20.0 | 43.2 |
| Com. Ex. 9 | 0.320 | 44.6 | 22.0 | 29.7 | 65.6 |
| Com. Ex. 10 | 1.920 | 82.9 | 53.0 | 11.5 | 36.5 |

Note:
[1]PD represents pore diameters (μm).

| | Pores Measured by Mercury Porosimetry | | Pores Open on Cell Wall Surfaces | | |
|---|---|---|---|---|---|
| No. | Cumulative Pore Volume (%) in $PD^{(1)} > 50$ | Pore distribution Deviation σ | Opening Area Ratio (%) | Median Opening Diameter (μm) | Cumulative Opening Area (%) in $OD^{(2)} \leq 30$ |
| Example 1 | 13.2 | 0.30 | 32.5 | 68.8 | 24.1 |
| Example 2 | 15.9 | 0.28 | 34.6 | 74.9 | 17.0 |
| Example 3 | 16.7 | 0.32 | 36.7 | 83.3 | 13.2 |
| Example 4 | 16.5 | 0.28 | 40.5 | 90.5 | 10.2 |
| Example 5 | 12.5 | 0.28 | 33.3 | 61.7 | 20.0 |
| Example 6 | 15.7 | 0.27 | 34.1 | 66.4 | 18.3 |
| Example 7 | 18.3 | 0.31 | 41.2 | 92.3 | 16.5 |
| Example 8 | 28.0 | 0.26 | 55.2 | 122.0 | 9.1 |
| Example 9 | 29.2 | 0.22 | 54.1 | 109.0 | 11.4 |
| Example 10 | 18.9 | 0.26 | 32.1 | 82.1 | 21.2 |
| Example 11 | 14.3 | 0.32 | 34.8 | 82.9 | 18.8 |
| Example 12 | 20.9 | 0.32 | 38.8 | 85.1 | 17.9 |
| Example 13 | 14.7 | 0.32 | 35.1 | 82.2 | 16.7 |
| Example 14 | 27.9 | 0.37 | 52.0 | 111.0 | 15.0 |
| Example 15 | 13.3 | 0.30 | 27.9 | 58.7 | 26.0 |
| Example 16 | 17.0 | 0.30 | 32.1 | 59.2 | 23.8 |
| Com. Ex. 1 | 8.3 | 0.30 | 18.0 | 32.0 | 46.2 |
| Com. Ex. 2 | 11.4 | 0.30 | 25.0 | 41.0 | 38.8 |
| Com. Ex. 3 | 13.8 | 0.30 | 32.0 | 58.0 | 30.3 |
| Com. Ex. 4 | 60.0 | 0.38 | 31.0 | 71.0 | 23.4 |
| Com. Ex. 5 | 75.9 | 0.22 | 28.0 | 59.0 | 29.2 |
| Com. Ex. 6 | 54.5 | 0.40 | 59.0 | 151.0 | 7.3 |
| Com. Ex. 7 | 17.4 | 0.36 | 26.8 | 80.2 | 22.2 |
| Com. Ex. 8 | 36.8 | 0.44 | 41.1 | 93.3 | 11.2 |
| Com. Ex. 9 | 4.7 | 0.27 | 27.0 | 48.2 | 33.6 |
| Com. Ex. 10 | 52.1 | 0.35 | 52.1 | 113.3 | 10.3 |

Note:
[1]PD represents pore diameters (μm).
[2]OD represents the opening diameters of pores.

| No. | Cumulative Opening Area (%) in 100 μm or more[1] | Permeability ($\times 10^{-12}$ m$^2$) | A-Axis Compression Strength (MPa) | CTE (20-800° C.) ($\times 10^{-7}$/° C.) | Evaluation of Filter Pressure Loss | Catalytic Effect |
|---|---|---|---|---|---|---|
| Example 1 | 25.1 | 8.0 | 1.7 | 11.3 | Fair | Fair |
| Example 2 | 27.9 | 13.0 | 1.6 | 10.0 | Good | Good |
| Example 3 | 35.0 | 19.0 | 1.5 | 7.9 | Excellent | Excellent |
| Example 4 | 44.9 | 21.0 | 1.4 | 8.5 | Excellent | Excellent |
| Example 5 | 27.2 | 9.5 | 1.5 | 10.1 | Good | Fair |
| Example 6 | 31.9 | 16.0 | 1.3 | 9.7 | Excellent | Fair |
| Example 7 | 33.0 | 20.0 | 1.3 | 9.5 | Excellent | Good |
| Example 8 | 55.1 | 28.0 | 1.1 | 9.5 | Excellent | Excellent |
| Example 9 | 51.9 | 27.4 | 1.1 | 8.3 | Excellent | Excellent |
| Example 10 | 26.8 | 9.0 | 1.7 | 11.8 | Fair | Fair |
| Example 11 | 31.7 | 15.6 | 1.6 | 9.5 | Good | Good |
| Example 12 | 32.3 | 14.7 | 1.4 | 10.2 | Good | Good |
| Example 13 | 34.3 | 15.9 | 1.5 | 9.5 | Good | Excellent |
| Example 14 | 62.1 | 21.5 | 1.1 | 9.0 | Excellent | Good |
| Example 15 | 29.0 | 8.5 | 1.6 | 11.0 | Fair | Fair |
| Example 16 | 32.0 | 10.0 | 1.5 | 11.5 | Fair | Good |
| Com. Ex. 1 | 14.8 | 2.1 | 3.0 | 10.0 | — | — |
| Com. Ex. 2 | 23.4 | 4.0 | 2.6 | 11.1 | Poor | Poor |
| Com. Ex. 3 | 30.0 | 8.0 | 1.9 | 9.7 | Fair | Poor |
| Com. Ex. 4 | 31.2 | 8.5 | 0.7 | 13.0 | Poor | Poor |
| Com. Ex. 5 | 31.8 | 6.0 | 0.8 | 12.2 | Fair | Poor |
| Com. Ex. 6 | 72.3 | 38.0 | 0.4 | 11.0 | Good | Poor |
| Com. Ex. 7 | 32.0 | 26.0 | 1.0 | 10.1 | Good | Poor |
| Com. Ex. 8 | 44.5 | 32.0 | 0.6 | 11.2 | Good | Poor |

TABLE 4-continued

| | | | | | | |
|---|---|---|---|---|---|---|
| Com. Ex. 9 | 11.0 | 2.2 | 3.3 | 8.5 | Poor | Poor |
| Com. Ex. 10 | 75.6 | 26.0 | 0.9 | 12.0 | Fair | Poor |

Note:
[1]With respect to pores open on the cell wall surfaces, a cumulative opening area (%) in a pore opening diameter range of 100 μm or more.

Table 4 indicates that the ceramic honeycomb structures of Examples 1-16 (within the present invention) having high strength exhibit high capability of catalytically removing harmful substance with small pressure loss. On the other hand, the ceramic honeycomb structures of Comparative Examples 1-10 are poor not only in strength, but also in the capability of catalytically removing harmful substance.

EFFECT OF THE INVENTION

Because the ceramic honeycomb structure of the present invention ensures high flowability of an exhaust gas through pores in the cell walls while exhibiting high strength, even when it is not provided with plugs, an exhaust-gas-cleaning ceramic honeycomb structure exhibiting high capability of catalytically removing harmful substance with small pressure loss can be obtained by carrying a catalyst.

What is claimed is:

1. A ceramic honeycomb structure comprising a plurality of cells partitioned by porous cell walls, said cell walls having
   (a) porosity of 50-80%; and
   when measured by mercury porosimetry,
   (b) a median pore diameter being 25-50 μm;
   (c) (i) a cumulative pore volume in a pore diameter range of 20 μm or less being 25% or less of the total pore volume;
   (ii) a cumulative pore volume in a pore diameter range of more than 20 μm and 50 μm or less being 50% or more of the total pore volume; and
   (iii) a cumulative pore volume in a pore diameter range of more than 50 μm being 12% or more of the total pore volume;
   wherein an opening area ratio of pores open on said cell wall surfaces (a total opening area of pores per a unit cell wall surface area) is 30% or more; and
   wherein said ceramic honeycomb structure has an A-axis compression strength of 1.0 MPa or more.

2. The ceramic honeycomb structure according to claim 1, wherein pores open on said cell wall surfaces have a median opening diameter (expressed by an equivalent circle diameter) of 60 μm or more.

3. The ceramic honeycomb structure according to claim 1, wherein a cumulative opening area of pores open on said cell wall surfaces, which have opening diameters (each expressed by an equivalent circle diameter) of 30 μm or less, is 20% or less of the total opening area.

4. The ceramic honeycomb structure according to claim 1, wherein a cumulative opening area of pores open on said cell wall surfaces, which have opening diameters (each expressed by an equivalent circle diameter) of 100 μm or more, is 30-70% of the total opening area.

5. The ceramic honeycomb structure according to claim 1, wherein said cell walls have permeability of $10 \times 10^{-12}$ m$^2$ to $30 \times 10^{-12}$ m$^2$.

* * * * *